US008760988B2

(12) United States Patent
Nakamura

(10) Patent No.: US 8,760,988 B2
(45) Date of Patent: *Jun. 24, 2014

(54) OPTICAL INFORMATION RECORDING APPARATUS, OPTICAL INFORMATION RECORDING METHOD, OPTICAL INFORMATION REPRODUCING APPARATUS AND OPTICAL INFORMATION REPRODUCING METHOD

(71) Applicant: Hitachi, Ltd., Tokyo (JP)

(72) Inventor: Yusuke Nakamura, Ebina (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/752,736

(22) Filed: Jan. 29, 2013

(65) Prior Publication Data

US 2013/0142025 A1 Jun. 6, 2013

Related U.S. Application Data

(63) Continuation of application No. 13/424,480, filed on Mar. 20, 2012, now Pat. No. 8,379,500, which is a continuation of application No. 12/457,376, filed on Jun. 9, 2009, now Pat. No. 8,159,923.

(30) Foreign Application Priority Data

Jun. 20, 2008 (JP) .................................. 2008-161132

(51) Int. Cl.
G11B 7/00 (2006.01)
(52) U.S. Cl.
USPC ......................................... 369/103

(58) Field of Classification Search
USPC ......................................... 369/103
See application file for complete search history.

(56) References Cited

U.S. PATENT DOCUMENTS

| 6,661,725 | B2 | 12/2003 | Roh |
| 7,206,105 | B2 | 4/2007 | Kuroda et al. |
| 7,319,550 | B2 | 1/2008 | Hayashi et al. |
| 7,321,541 | B2 | 1/2008 | Horimai |
| 7,619,794 | B2 | 11/2009 | Baba |

(Continued)

FOREIGN PATENT DOCUMENTS

| EP | 1 324 323 A2 | 7/2003 |
| EP | 1 457 974 A1 | 9/2004 |

(Continued)

OTHER PUBLICATIONS

B. Marcus, "Modulation Codes for Holographic Recording", Holographic Data Storage, pp. 283-292.

(Continued)

Primary Examiner — Brenda Bernardi
(74) Attorney, Agent, or Firm — Nicholas Trenkle; Stites & Harbison, PLLC

(57) ABSTRACT

An optical information recording/reproducing apparatus and an optical information recording/reproducing method that record information using holography, wherein the optical information recording/reproducing apparatus includes a signal generation unit that generates two-dimensional data by a two-dimensional encoding method in which a lower-limit value of a number of continuous ON/OFF pixels in an array in one direction of pixels in a two-dimensional spatial light modulator is K(K≥2, K: natural number); and a pickup that records the two-dimensional data, generated by the signal generation unit, on a hologram disc.

36 Claims, 9 Drawing Sheets

(56) References Cited

U.S. PATENT DOCUMENTS

| | | |
|---|---|---|
| 7,715,072 B2 | 5/2010 | Tsukagoshi et al. |
| 2001/0024410 A1 | 9/2001 | Kumai et al. |
| 2003/0185077 A1 | 10/2003 | Roh |
| 2005/0135217 A1 | 6/2005 | Tateishi et al. |
| 2005/0231774 A1 | 10/2005 | Hayashi et al. |
| 2006/0256414 A1 | 11/2006 | Baba |
| 2007/0206478 A1 | 9/2007 | Uchida et al. |
| 2008/0117788 A1 | 5/2008 | Kasazumi et al. |
| 2008/0165604 A1 | 7/2008 | Kim et al. |
| 2008/0192313 A1 | 8/2008 | Matsumura et al. |
| 2008/0316894 A1 | 12/2008 | Choi |
| 2009/0161519 A1 | 6/2009 | Yamamoto et al. |
| 2009/0316558 A1 | 12/2009 | Hashimoto et al. |

FOREIGN PATENT DOCUMENTS

| | | |
|---|---|---|
| EP | 1 550 922 A1 | 7/2005 |
| EP | 1 785 987 A2 | 5/2007 |
| EP | 1 785 987 A3 | 5/2007 |
| JP | 09-197947 | 7/1997 |
| JP | 2000-98862 A | 4/2000 |
| JP | 2004-272268 | 9/2004 |
| JP | 2005-301038 A | 10/2005 |
| JP | 2006-194969 A | 7/2006 |
| JP | 2006-343702 A | 12/2006 |
| JP | 2007-60098 A | 3/2007 |
| JP | 2007060098 A * | 3/2007 |
| WO | WO 92/21125 | 11/1992 |
| WO | WO 2004-102542 | 11/2004 |

OTHER PUBLICATIONS

Search Report / Office Action Communication issued by the European Patent Office on Jan. 13, 2011 for Application No. 09 162 969.1-1232.

Ashley, Two-Dimensional Low-Pass Filtering Codes, Jun. 1998, IEEE Transactions on Communications, vol. 46, No. 6. pp. 724-731.

Office Action from the Japanese Patent Office in corresponding Japanese Patent Application No. 2012-187129, dated Jun. 18, 2013, pp. 1-2.

Partial European Search Report for App. No. 09162969.1-1232 mailed Oct. 27, 2009.

Jonathan J. Ashley et al., "Two-Dimensional Low-Pass Filtering Codes", IEEE Transactions on Communications, vol. 46, No. 6, Jun. 1998, pp. 724-731.

John F. Heanue et al., "Volume Holographic Storage and Retrieval of Digital Data", Science, vol. 265, Aug. 5, 1994, pp. 749-752.

Maria-P. Bernal et al., "Balancing Interpixel Cross Talk and Detector Noise to Optimize Areal Density in Holographic Storage Systems", Applied Optics, vol. 37, No. 23, Aug. 10, 1998, pp. 5377-5385.

B. Marcus, "Modulation Codes for Holographic Recording", Holographic Data Storage, pp. 283-292, 2000.

European Search Report/Office Action from European Patent Office for App. No. 09162969.1-1232 mailed Feb. 2, 2010.

Search Report/Office Action Communication issued by the European Patent Office on Jan. 13, 2011 for Application No. 09 162 969.1-1232.

Ashley, Two-Dimensional Low-Pass Filtering Codes, Jun. 1998, IEEE Transactions on Communications, vol. 46, No. 6 pp. 724-731.

\* cited by examiner

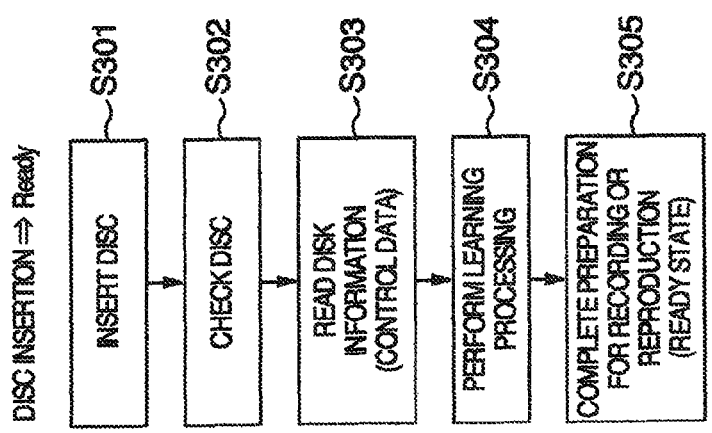
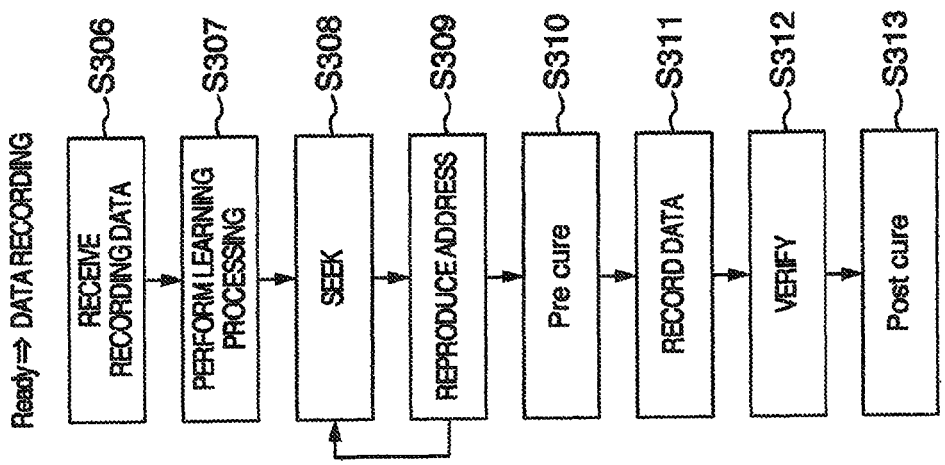
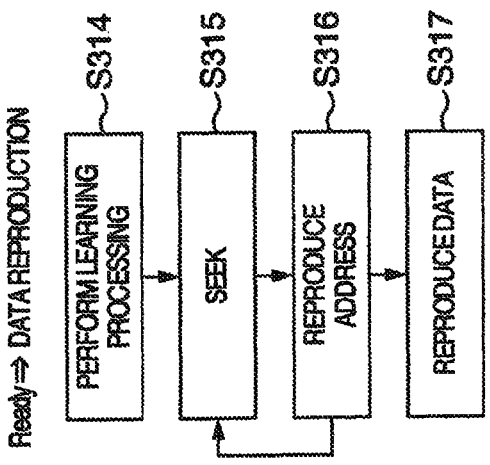

FIG.11A
FIG.11B
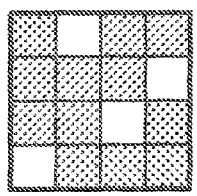
AAA
FIG.12A
FIG.12B
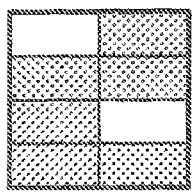
AAA

OPTICAL INFORMATION RECORDING APPARATUS, OPTICAL INFORMATION RECORDING METHOD, OPTICAL INFORMATION REPRODUCING APPARATUS AND OPTICAL INFORMATION REPRODUCING METHOD

INCORPORATION BY REFERENCE

The present application is a Continuation of U.S. application Ser. No. 13/424,480 filed on Mar. 20, 2012, which is a Continuation of U.S. application Ser. No. 12/457,376 filed on Jun. 9, 2009. The present application claims priority from U.S. application Ser. No. 13/424,480 filed on Mar. 20, 2012, which claims priority from U.S. application Ser. No. 12/457,376 filed on Jun. 9, 2009, which claims priority from Japanese application 2008-161132 filed on Jun. 20, 2008, the content of which is hereby incorporated by reference into this application.

BACKGROUND OF THE INVENTION

The present invention relates to an apparatus that records information on an optical information recording medium and/or reproduces information from an optical information recording medium by means of holography.

Today, an optical disc with a recording density of about 50 GB is commercialized for consumer's use based on the Blu-ray Disc (BD) standard using blue-violet semiconductor laser.

In future, the capacity of an optical disc will be increased to the capacity equivalent to that of an HDD(Hard Disc Drive) that has a capacity of 100 GB to 1 TB.

However, the implementation of such a very high-density optical disc requires a new storage technology different from the trend in the conventional high-density technology based on short-wavelengths and high-NA objective lens.

Much effort has been made to study the next-generation storage technologies, and one of those technologies is the hologram recording technology that records digital information by means of holography.

A hologram recording technology is disclosed, for example, in JP-A-2004-272268. This document describes the so-called angular multiplex-recording method in which the signal luminous flux is condensed on an optical information recording medium through a lens and, at the same time, the reference beam of the parallel luminous flux is focused thereon to produce interference for hologram recording and, in addition, different page data is displayed on the spatial light modulator for multiplex recording while changing the incident angle of the reference beam onto the optical recording medium. In addition, this document describes the technology that can shorten the interval between neighboring holograms by condensing the signal beam through a lens and providing an aperture (spatial filter) in the beam waist and thereby increase the recording density/capacity as compared to that of the conventional angular multiplex-recording method.

Another hologram recording technology is described, for example, in WO2004/102542. This document describes an example of the shift multiplexing method in which, with the beams from inner pixels in one spatial light modulator as the signal beam and the beams from outer, bracelet-like pixels as the reference beam, both luminous fluxes are condensed on an optical recording medium through the same lens to produce interference between the signal beam and the reference beam near the focal point surface of the lens for hologram recording.

An encoding method for the hologram recording described above is disclosed, for example, in JP-A-9-197947. This document describes a two-dimensional encoding method for hologram recording that determines recording information by passing at least one light-wave through the two-dimensional spatial light modulator, wherein, with the neighboring four, or a multiple of four, pixels of the two-dimensional spatial light modulator combined into one set, a quarter of the pixels of each set pass the light and the three quarters of the pixels block the light.

SUMMARY OF THE INVENTION

The size of the holograms recorded on an optical recording medium in the method disclosed in JP-A-2004-272268 or WO2004/102542 depends on the pixel pitch of the spatial light modulator and, so, if the pixel pitch of the spatial light modulator is decreased for higher density, the problem is that the hologram size is increased and it becomes difficult to increase the density. If the pixel pitch of the light detector is small at reproduction time, satisfactory sampling cannot be performed with the problem that the read accuracy is decreased.

It is an object of the present invention to provide a two-dimensional encoding method that can increase the density and increase the read accuracy by decreasing the hologram size without changing the pixel pitch of the spatial light modulator.

The object of the present invention can be achieved, for example, by controlling the number of continuous ON/OFF pixels of the two-dimensional spatial light modulator.

According to the present invention, the hologram size can be changed without changing the pixel pitch of the spatial light modulator when digital information is recorded through holography. In addition, the size of the minimum pattern of the ON/OFF pixels of the two-dimensional spatial light modulator can be changed.

Other objects, features and advantages of the invention will become apparent from the following description of the embodiments of the invention taken in conjunction with the accompanying drawings.

BRIEF DESCRIPTION OF THE DRAWINGS

FIGS. 3A-3C are flowcharts showing an example of the operation flow of the optical information recording/reproducing apparatus.

FIGS. 11A and 11B are diagrams showing examples of conventional two-dimensional patterns used for encoding by the optical information recording/reproducing apparatus.

FIGS. 12A and 12B are diagrams showing examples of two-dimensional patterns, where the pixel pitch is increased two times, used for encoding by the optical information recording/reproducing apparatus.

DETAILED DESCRIPTION OF THE INVENTION

Figure 1:
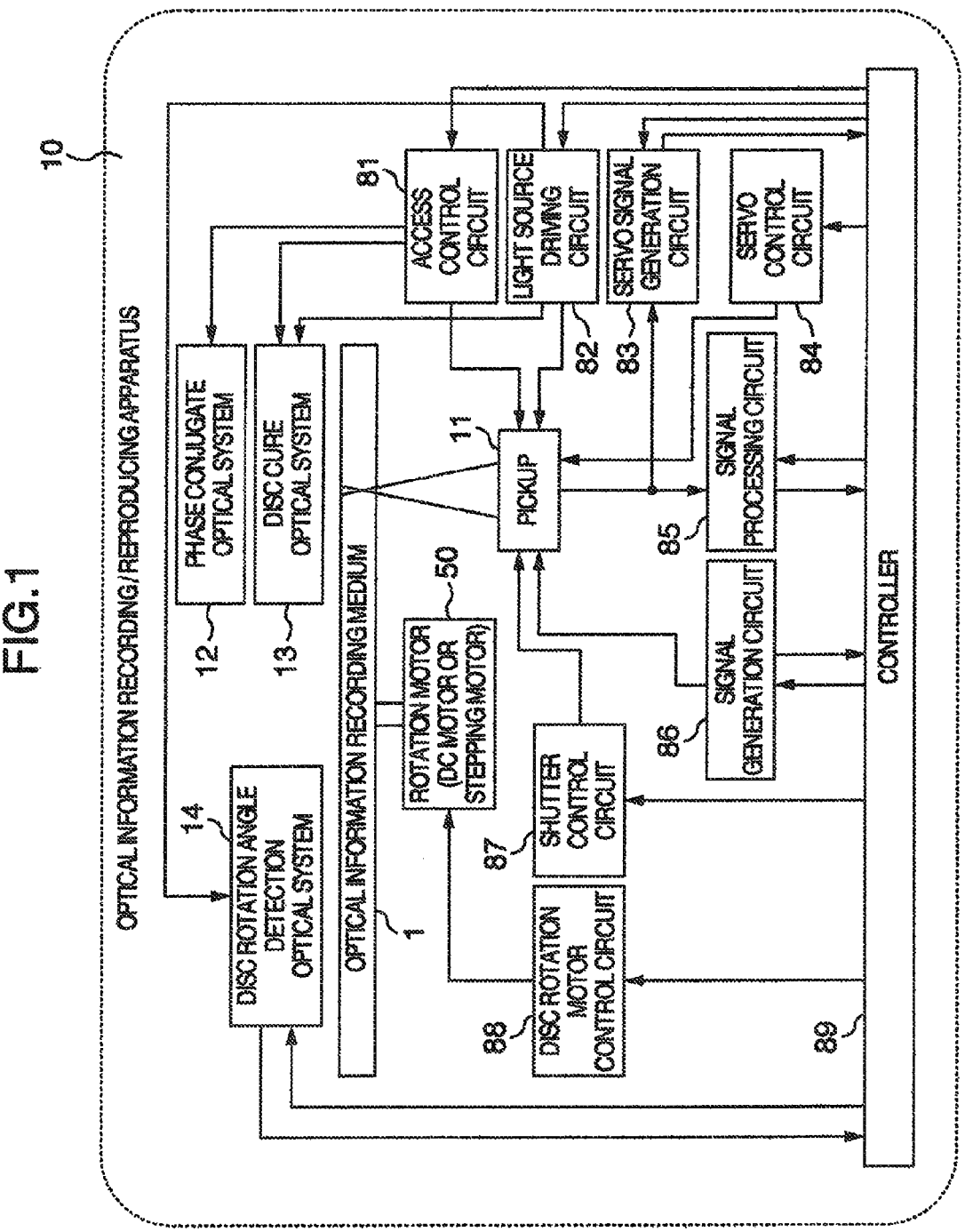
FIG. 1 is a diagram showing the general configuration of an embodiment of an optical information recording/reproducing apparatus.

Embodiments of the present invention will be described below.
[First Embodiment]
FIG. 1 shows the general configuration of an optical information recording/reproducing apparatus that records and/or reproduces digital information through holography.

An optical information recording/reproducing apparatus 10 comprises a pickup 11, a phase conjugate optical system 12, a disc cure optical system 13, a disc rotation angle detection optical system 14, and a rotation motor 50, and an optical information recording medium 1 is rotated by the rotation motor 50.

The pickup 11 emits the reference beam and the signal beam onto the optical information recording medium 1 to record digital information thereon through holography.

At this time, the information signal to be recorded is sent by a controller 89 to the spatial light modulator, which will be described later, in the pickup 11 via a signal generation circuit 86, and the signal beam is modulated by the spatial light modulator.

To reproduce information recorded on the optical information recording medium 1, the phase conjugate beam of the reference beam emitted from the pickup 11 is generated by the phase conjugate optical system 12. The phase conjugate beam refers to a light-wave that propagates in the direction opposite to that of the input beam while maintaining the same wave-front. The reproduced beam, which is reproduced by the phase conjugate beam, is detected by a photo-detector, which will be described later, in the pickup 11, and the signal is reproduced by a signal processing circuit 85.

The focus time of the reference beam and the signal beam, which are focused on the optical information recording medium 1, can be adjusted by controlling the open/close time of a shutter, which will be described later, in the pickup 11 by the controller 89 via a shutter control circuit 87.

The disc cure optical system 13 performs the function of generating a light beam used for the pre-cure and the post-cure of the optical information recording medium 1. The pre-cure refers to the pre-process in which, when information is recorded in a desired position on the optical information recording medium 1, a predetermined light beam is focused in advance in the predetermined position before the reference beam and the signal beam are focused. The post-cure refers to the post-process in which, after information is recorded in a desired position on the optical information recording medium 1, a predetermined light beam is focused in the desired position to prevent information from being added thereto.

The disc rotation angle detection optical system 14 is used to detect the rotation angle of the optical information recording medium 1. To adjust the rotation angle of the optical information recording medium 1 to a predetermined rotation angle, the disc rotation angle detection optical system 14 is used to detect the signal corresponding to the rotation angle and, using the detected signal, the rotation angle of the optical information recording medium 1 is controlled by the controller 89 via a disc rotation motor control circuit 88.

A predetermined optical source driving current is supplied from a light source driving circuit 82 to the light sources in the pickup 11, the disc cure optical system 13, and the disc rotation angle detection optical system 14, and a light beam with a predetermined amount of light can be emitted from each of the light sources.

Each of the pickup 11, phase conjugate optical system 12, and disc cure optical system 13 has a mechanism provided therein to slide into the radial direction of the optical information recording medium 1, and the position is controlled via an access control circuit 81.

Because the holography-based recording technology is a technology capable of recording information at a very high density, there is a tendency that an allowable error, for example, in the tilt or in the position of the optical information recording medium 1 is extremely small. For this reason, the optical information recording/reproducing apparatus 10 may comprise a mechanism in the pickup 11 for detecting the shift amount of a factor whose allowable error is small, such as a shift in the tilt or in the position of the optical information recording medium 1, to cause a servo signal generation circuit 83 to generate the servo control signal as well as a servo mechanism for correcting the shift amount via a servo control circuit 84.

Some or all of optical system configurations, that is, the pickup 11, phase conjugate optical system 12, disc cure optical system 13, and disc rotation angle detection optical system 14, may be combined into one simple configuration.

Figure 2:
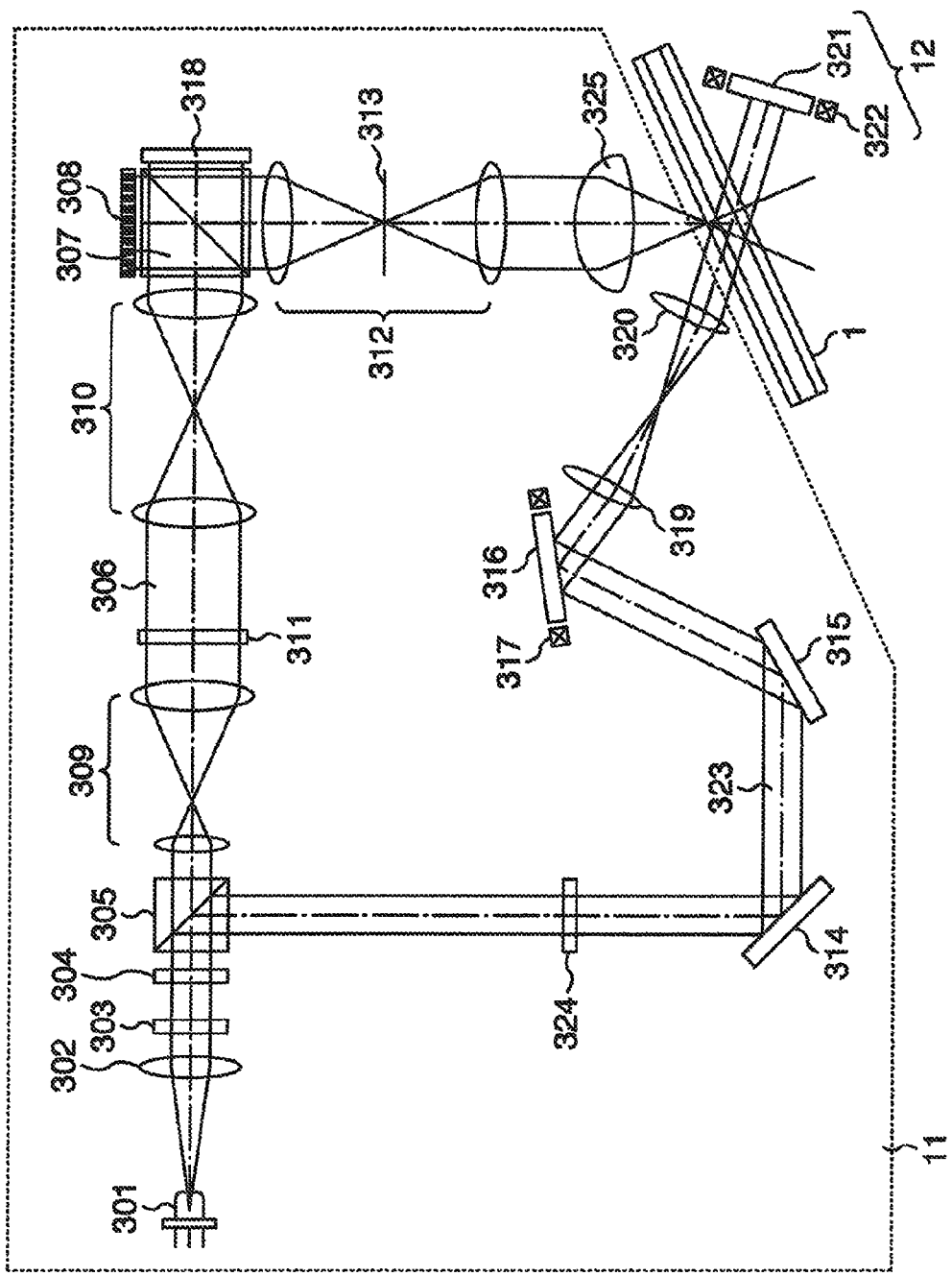
FIG. 2 is a diagram showing the general configuration of an embodiment of a pickup in the optical information recording/reproducing apparatus.

FIG. 2 is a diagram showing an example of the optical system configuration of the pickup 11 in the optical information recording/reproducing apparatus 10.

A light beam emitted from a light source 301 transmits through a collimate lens 302 and enters a shutter 303. When the shutter 303 is open, the light beam passes through the shutter 303 and, after having its polarization direction controlled by an optical element 304 composed of a half-wave plate so that the light amount ratio between the P-polarized light and the S-polarized light becomes a desired ratio, enters a PBS(Polarization Beam Splitter) prism 305.

The light beam that transmits through the PBS prism 305 has its light beam diameter expanded by a beam expander 309, passes through a phase mask 311, a relay lens 310, and a PBS prism 307, and enters a spatial light modulator 308.

The signal beam, to which information is added by the spatial light modulator 308, transmits through the PBS prism 307 and propagates through a relay lens 312 and a spatial filter 313. After that, the signal beam is focused on the optical information recording medium 1 by an objective lens 325.

On the other hand, the light beam reflected on the PBS prism 305, which functions as the reference beam, has its polarization direction set to a predetermined direction by a polarization direction conversion element 324 according to the recording time and reproduction time and enters a galvanometer mirror 316 via a mirror 314 and a mirror 315. Because the angle of the galvanometer mirror 316 can be adjusted by an actuator 317, the incident angle of the reference beam, which transmits through a lens 319 and a lens 320 and enters the optical information recording medium 1, can be set to a desired angle.

By focusing the signal beam and the reference beam on the optical information recording medium 1 in such a way that they are overlapped, an interference stripe pattern is formed in the recording medium and, by writing this pattern in the recording medium, the information is recorded. In addition, the galvanometer mirror 316, which can change the incident angle of the reference beam entering the optical information recording medium 1, allows information to be recorded through angular multiplexing.

To reproduce the recorded information, the reference beam is focused on the optical information recording medium 1 as described above to cause the light beam, which transmits through the optical information recording medium 1, to be reflected on a galvanometer mirror 321 to generate a phase conjugate beam.

The reproduced light beam reproduced by this phase conjugate beam propagates through the objective lens 325, relay lens 312, and spatial filter 313. After that, the reproduced light beam is reflected on the PBS prism 307 and enters a photodetector 318 for reproducing the recorded signal.

Note that the optical system configuration of the pickup 11 is not limited to the configuration shown in FIG. 2.

FIGS. 3A-3C show the operation flow of recording and reproduction on the optical information recording/reproducing apparatus 10. The following describes the flow of holography-based recording and reproduction.

FIG. 3A is an operation flow from the time the optical information recording medium 1 is inserted into the optical information recording/reproducing apparatus 10 to the time the apparatus becomes ready for recording and reproduction, FIG. 3B is an operation flow from the ready state to the time information is recorded on the optical information recording medium 1, and FIG. 3C is an operation flow from the ready state to the time information recorded on the optical information recording medium 1 is reproduced.

As shown in FIG. 3A, when a medium is inserted (S301), the optical information recording/reproducing apparatus 10 checks the disc if the inserted medium is a medium to or from which holography-based digital information is recorded or reproduced (S302).

If the disc checking result indicates that the medium is an optical information recording medium to or from which holography-based digital information is recorded or reproduced, the optical information recording/reproducing apparatus 10 reads control data from the optical information recording medium and acquires, for example, information on the optical information recording medium or information on various setting conditions at recording or reproduction time (S303).

After reading the control data, the optical information recording/reproducing apparatus 10 performs various adjustments according to the control data and the learning processing for the pickup 11 (S304) and completes the preparation for recording or reproduction (S305).

As shown in FIG. 3B, the operation flow from the ready state to the information recording is started first by receiving data to be recorded and sending the information, corresponding to the data, to the spatial light modulator in the pickup 11 (S306).

After that, various types of learning processing are performed as necessary in advance so that high-quality information can be recorded on the optical information recording medium (S307) and, while repeating the seek operation (S308) and the address reproduction (S309), the positions of the pickup 11 and the disc cure optical system 13 are set in a predetermined position on the optical information recording medium.

After that, the predetermined area is pre-cured using a light beam emitted from the disc cure optical system 13 (S310), and data is recorded using the reference beam and the signal beam emitted from the pickup 11 (S311).

After recorded, the data is verified as necessary (S312) and the post-cure processing is performed using a light beam emitted from the disc cure optical system 13 (S313).

In the operation flow from the ready state to the reproduction of recorded information, various types of learning processing are performed as necessary in advance so that high-quality information can be reproduced from the optical information recording medium as shown in FIG. 3C (S314). After that, while repeating the seek operation (S315) and the address reproduction (S316), the positions of the pickup 11 and the phase conjugate optical system 12 are set to a predetermined position on the optical information recording medium.

After that, the reference beam is emitted from the pickup 11 to read information recorded on the optical information recording medium (S317).

Figure 4:
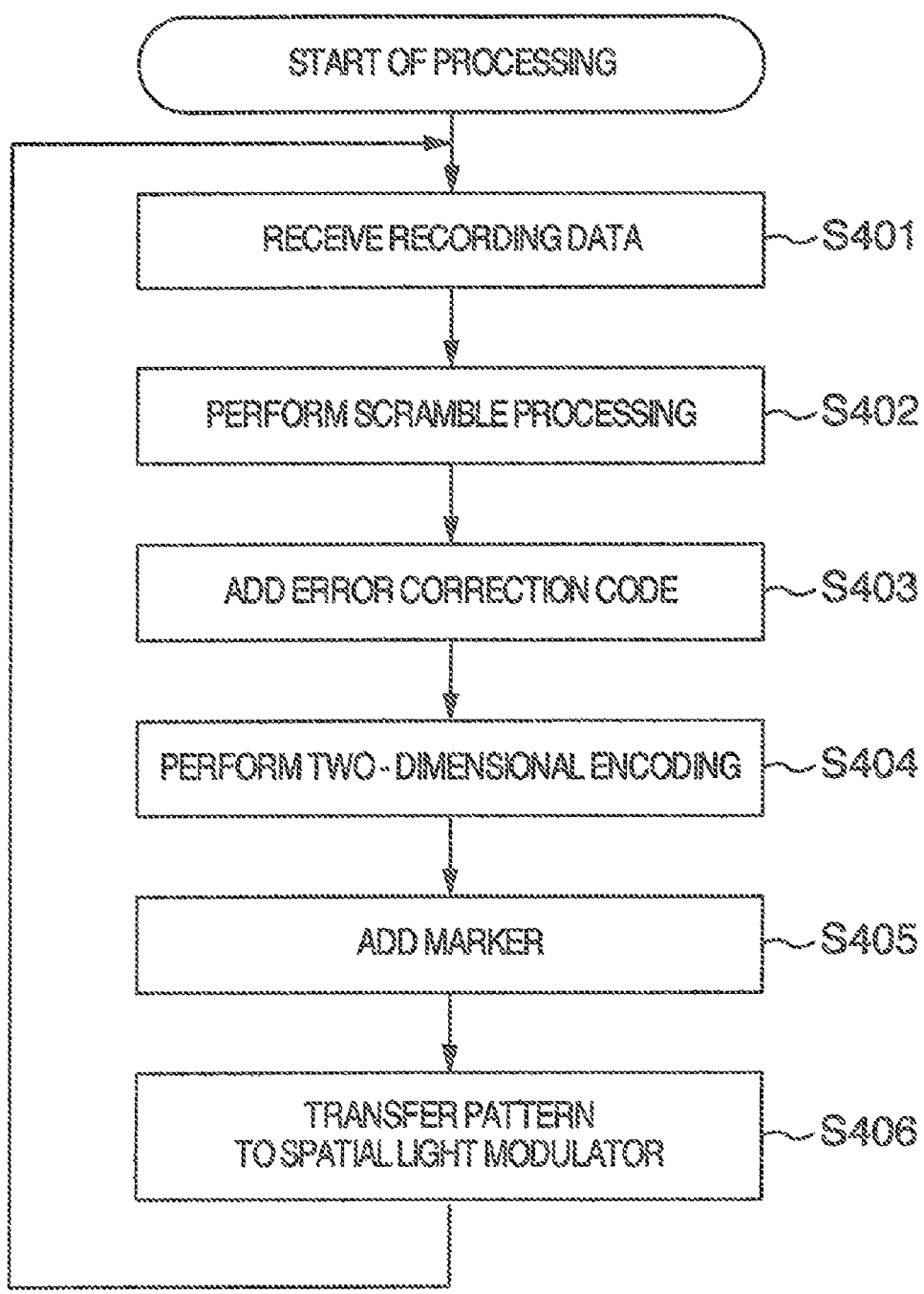
FIG. 4 is a flowchart showing an example of the detailed operation flow of the optical information recording/reproducing apparatus at data recording time.
Figure 5:
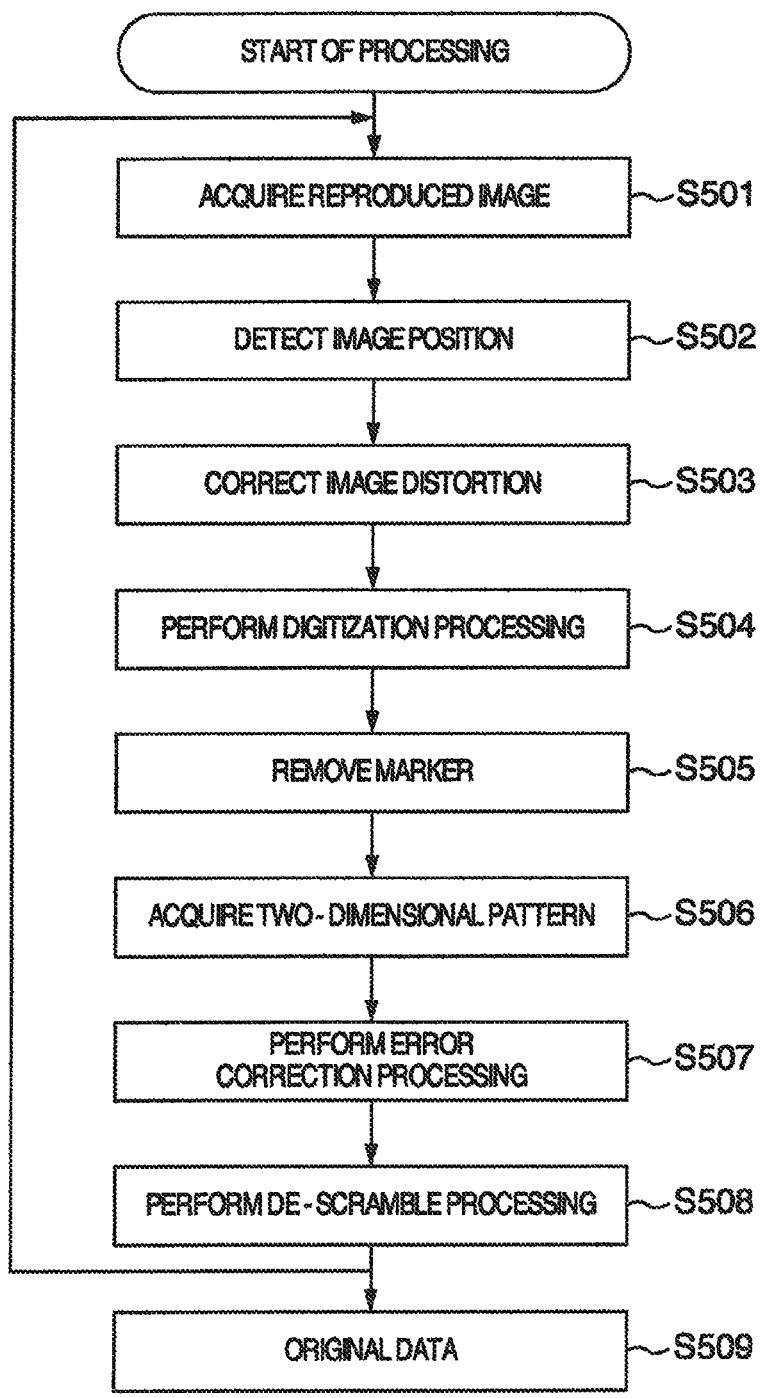
FIG. 5 is a flowchart showing an example of the detailed operation flow of the optical information recording/reproducing apparatus at data reproduction time.

The following describes the encoding method in this embodiment with reference to FIG. 4 and FIG. 5. FIG. 4 shows the detailed operation flow in S306 in FIG. 3B, and FIG. 5 shows the detailed operation flow in S317 in FIG. 3C.

Figure 6A:
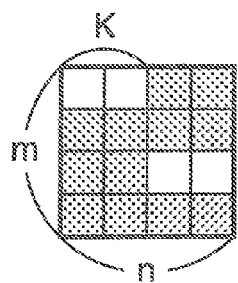
FIGS. 6A and 6B are diagrams showing examples of two-dimensional patterns used for encoding by the optical information recording/reproducing apparatus.

First, the following describes the detailed operation at recording time. When one page of recording data is received (S401), the signal generation circuit 86 performs scramble processing for the data string (S402) and adds an error correction code such as a read solomon code (S403). This scrambling processing, which is performed to prevent data "0" and "1" from appearing continuously for avoiding the continuous occurrence of the same pattern, need not always be performed. Next, with the data "0" and "1" assigned to the OFF pixel and the "ON" pixel (the reverse is also possible), an n×m (n and m are natural numbers) two-dimensional pattern is arranged for each N bits (N: natural number) in the assignment order, and this arrangement is repeated for the number of pieces of page data to configure one-page, two-dimensional data (S404). As an example, a two-dimensional pattern where n=m=4 is shown in FIG. 6A. In this example, though the white color is shown as the ON pixel, and the black color as the OFF pixel, in the figure, the reverse may also be possible. This applies also to other figures. A marker, which will be used as the base at reproduction time, is added to the two-dimensional data configured in this way (S405) and the resulting data is transferred to the spatial light modulator 308 (S406). In the spatial light modulator 308, the ON pixel is processed as transmittable, and the OFF pixel as non-transmittable, to add information to the signal beam.

Next, the following describes the detailed operation at reproduction time. First, image data acquired from the photodetector 318 is transferred to the signal processing circuit 85 (S501). The image position is detected with the image marker as the base (S502), a distortion in the image tilt, magnification, and distortion is corrected (S503), the corrected image is digitized (S504), and the marker is removed (S505) for producing two-dimensional data (S506). After that, the reverse process of the recording-time process is performed to demodulate the two-dimensional data into one-dimensional data, and the error correction processing (S507) and de-scramble processing (S508) are performed for producing the original data (S509).

Note that, as long as data can be recorded, the order of the detailed operation at recording time described above is not limited to the order described above; for example, the operation may be performed not in S306 but in S311 in FIG. 3B depending upon the operation of the drive. The order is not limited either in the detailed operation at reproduction time.

Figure 6B:

The recording/reproduction operation in this embodiment described above is characterized in the two-dimensional pattern shown in FIG. 6A or FIG. 6B used in the two-dimensional encoding (S404). This pattern is characterized in that the lower-limit value of the number of continuous ON/OFF pixels in the array in one direction is restricted to K(K≥2, K: natural number). For example, when K=2, the lower-limit value of the number of continuous pixels is two pixels and, so, the continuous number of ON/OFF pixels in the array is at least two pixels, such as two pixels, three pixels, four pixels, and so on, but one pixel is not included. Similarly, when K=3, the lower-limit value of the number of continuous pixels is three pixels and, so, the continuous number of ON/OFF pixels in the array is at least three pixels, such as three pixels, four pixels, five pixels, and so on, but one pixel and two pixels are not included.

This pattern, which does not include one-pixel isolated pattern, can reduce the effect of pixel-to-pixel interference at reproduction time, increase read accuracy and, at the same time, decrease the hologram size in the recording medium 1/K times its original size. The following describes the reason. In general, the size of a hologram recorded in the hologram recording medium is given by expression 1 below, indicating that the hologram size is inversely proportional to the pixel size of the spatial light modulator.

$$L = f \cdot \lambda / \Delta \qquad \text{Expression 1}$$

L: Hologram size on Fourier plane (in hologram recording medium)
f: Focal distance of objective lens (325 in FIG. 2)
λ: Wavelength of light source (301 in FIG. 2)
Δ: Pixel size of spatial light modulator (308 in FIG. 2)

Because a larger hologram size makes it difficult to increase the density, the pixel size should be large to decrease the hologram size. Because of this, the lower-limit value of the number of continuous ON/OFF pixels in the array in one direction is set to K (K=2 in the horizontal direction in FIGS. 6A and 6B) in the example in FIG. 6A and FIG. 6B in this embodiment to increase the effective pixel size K times. This makes it possible to decrease the hologram size 1/K times according to expression 1 and to decrease the interval between the neighboring holograms 1/K times and, as a result, increase the density of the whole disc K times.

Note that, though the lower-limit value, K, of the number of continuous pixels puts restrictions on the number of pattern combinations, the density becomes higher than the conventional density because it becomes K times higher. The following describes an example where K=2. First, to make the light amount of recording holograms constant, a two-dimensional pattern usually used has restrictions that the ON pixel ratio in the pattern must be constant. An example of the conventional 4×4 pattern shown in FIG. 11A has an ON pixel ratio of 4/16. For simplicity's sake, the example of 1×16 pattern in FIG. 11B is used here. In this example, because four bits are selected from 16 bits in FIGS. 11A and 11B, $_{16}C_4 = 1820$ ways are possible. This means that up to ten input bits ($2^{10} = 1024$ ways) can be assigned with the result that the encoding efficiency is 10/16=0.625. In contrast, in the pattern in FIGS. 6A and 6B in this embodiment, 79 ways are possible because isolated one-bit pattern is excluded (one-bit at the end is excluded). This means that only six input bits ($2^6 = 64$ ways) can be assigned with the result that the encoding efficiency is 6/16=0.375. However, because the restrictions of K=2 in the pattern in FIGS. 6A and 6B can increase the density two times, the effective encoding efficiency becomes 0.375×2=0.75 which is higher than the conventional encoding efficiency.

A higher ON pixel ratio makes this difference greater, and an increase in the encoding unit from 16 bits in the example also makes this difference greater. The application of this embodiment even makes it possible to increase the effective encoding efficiency to a value equal to or higher than 1. Also note that, though increasing the actual pixel pitch K times as shown in FIGS. 12A and 12B also decreases the hologram size 1/K times, the combination of the pattern is only $_8C_2 = 28$ ways. This means that the encoding efficiency is low and that this efficiency cannot exceeds the conventional efficiency. This is because, when the pixel pitch is increased two times, the possible pattern is a multiple of two of the original pixel size, such as two times, four times, eight times, ten times, and so on. In this embodiment in which only the lower-limit value of the number of continuous pixels is restricted, all patterns equal to or larger than 2 times, that is, two times, three times, four time, five times, and so on, are all available.

Figure 7A:
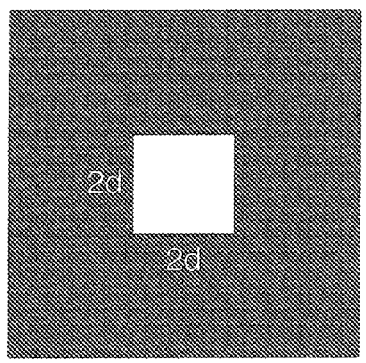
FIGS. 7A and 7B are diagrams showing examples of the shape of the spatial filter of the optical information recording/reproducing apparatus.
Figure 7B:
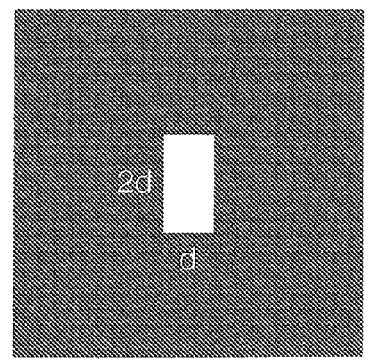

Because the hologram size is decreased 1/K times when this embodiment is applied, the shape of the spatial filter 313 must be changed accordingly. The reason is that it is a spatial filter that actually determines the hologram size. FIGS. 7A and 7B show an example when k=2. FIG. 7A shows the conventional spatial filter and, when this embodiment is used, it is desirable that the length be set to 1K times, as shown in FIG. 7B, in the direction in which the lower-limit value of the number of continuous pixels is set. Note that the spatial filter shown here is exemplary only and that the shape is not limited to this shape.

The drive configuration and operation described above are exemplary only. The configuration and operation are applicable not only to the angular multiplexing method described above but also to other methods such as the shift multiplexing method, and the configuration is not limited to the configuration described above. Although the patterns in FIGS. 6A and 6B are 4×4 and 1×16, the pattern is not limited to those patterns but the embodiment can be implemented as an n×m pattern. The direction in which the lower-limit value of the number of continuous pixels is set may be the vertical direction or horizontal direction. Those conditions are the same as in the embodiments that will be described below.

[Second Embodiment]

A second embodiment is different from the first embodiment in the configuration of the two-dimensional pattern used in S404 and in the shape of the spatial filter 313.

Figure 8A:
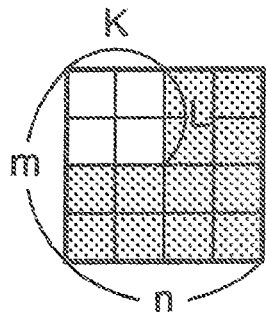
FIGS. 8A and 8B are diagrams showing examples of two-dimensional patterns used for encoding by the optical information recording/reproducing apparatus.

The lower-limit value of the number of continuous pixels in set only in one direction in the first embodiment, whereas the lower-limit value of the number of continuous pixels is set in both directions in this embodiment. FIG. 8A shows an example of a two-dimensional pattern in which the lower-limit value of the number of continuous pixels is set in both directions. Because two restrictions are placed, that is, the lower-limit value of the number of continuous ON/OFF pixels in the array in one direction is K(K≥2, K: Natural number) and the lower-limit value of the number of continuous ON/OFF pixels in the array in the direction orthogonal to the above-described direction is L(L≥2, L: Natural number), the hologram size is decreased 1/(K×L) times and the density can be increased K×L times. It is desirable that the spatial filter 313 be decreased 1/K times horizontally, and 1/L times vertically, in shape as compared to the spatial filter before the lower-limit values of the number of continuous pixels are set.

Figure 9A:
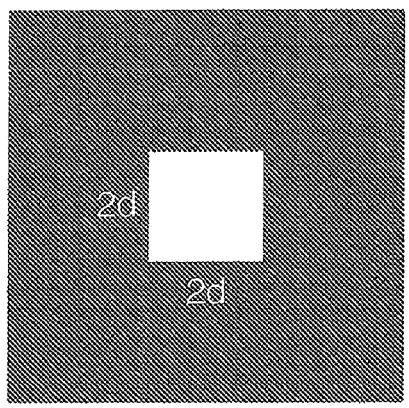
FIGS. 9A and 9B are diagrams showing examples of the shape of the spatial filter of the optical information recording/reproducing apparatus.
Figure 9B:
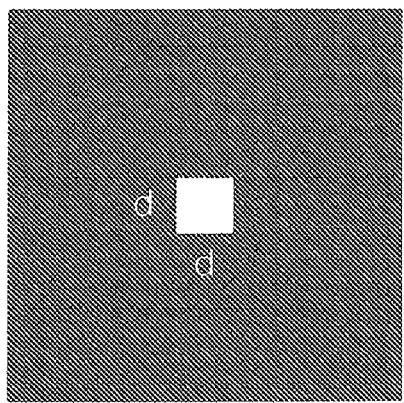

FIG. 9A shows an example of the shape of the conventional spatial filter, and FIG. 9B shows an example in which lower-limit values K=L=2 are set.

Because placing the restrictions as described above decreases the number of ways of the combination, the encoding efficiency becomes lower than that of the two-dimensional pattern shown in FIG. 11A that has the same size as that of the conventional pattern.

Figure 8B:
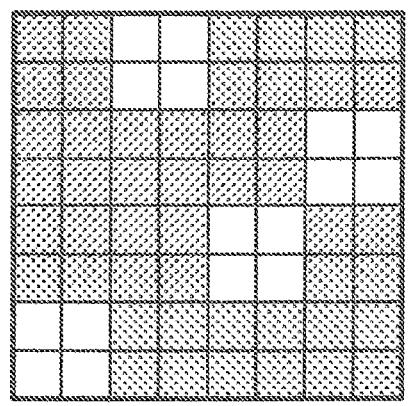

To solve this problem, the size of the two-dimensional pattern that is used is expanded from the original n×m to (n×K)×(m×L), and the two-dimensional encoding is performed with K×L pixels as one unit. FIG. 8B shows an example of K=L=2 and n=m=4. This pattern increases the density K×L=2×2=4 times the density of the conventional example shown in FIG. 11A. However, when the size of the spatial light modulator 308 is not changed, the amount of recordable data is decreased ¼ times because the size of the two-dimensional pattern is increased four times and, therefore, the recording density as a whole is not increased. However, because the minimum unit of ON/OFF pixels in this embodiment is K×L, the photo-detector 318 reads an image using K×L times oversampling and the read accuracy is increased.

[Third Embodiment]

This embodiment is characterized in that the two-dimensional encoding method, which is used, is switched according to the condition.

For example, the encoding method is switched in such a way that the second embodiment is used for an area containing information such as address or recording medium information where a read error, if generated, will cause a problem and that the conventional method in the example is used for other areas. It is also effective to switch the two-dimensional encoding method according to the type of recording medium.

Because the shape of the aperture of the spatial filter must be changed in this embodiment when the encoding method is switched, the spatial filter 313 should be configured by liquid crystal elements and the like. Note that, instead of using liquid crystal elements, any other method, in which the shape of the aperture is mechanically changed and so on, may also be used as long as the object of changing the shape or the characteristics is achieved.

Figure 10:
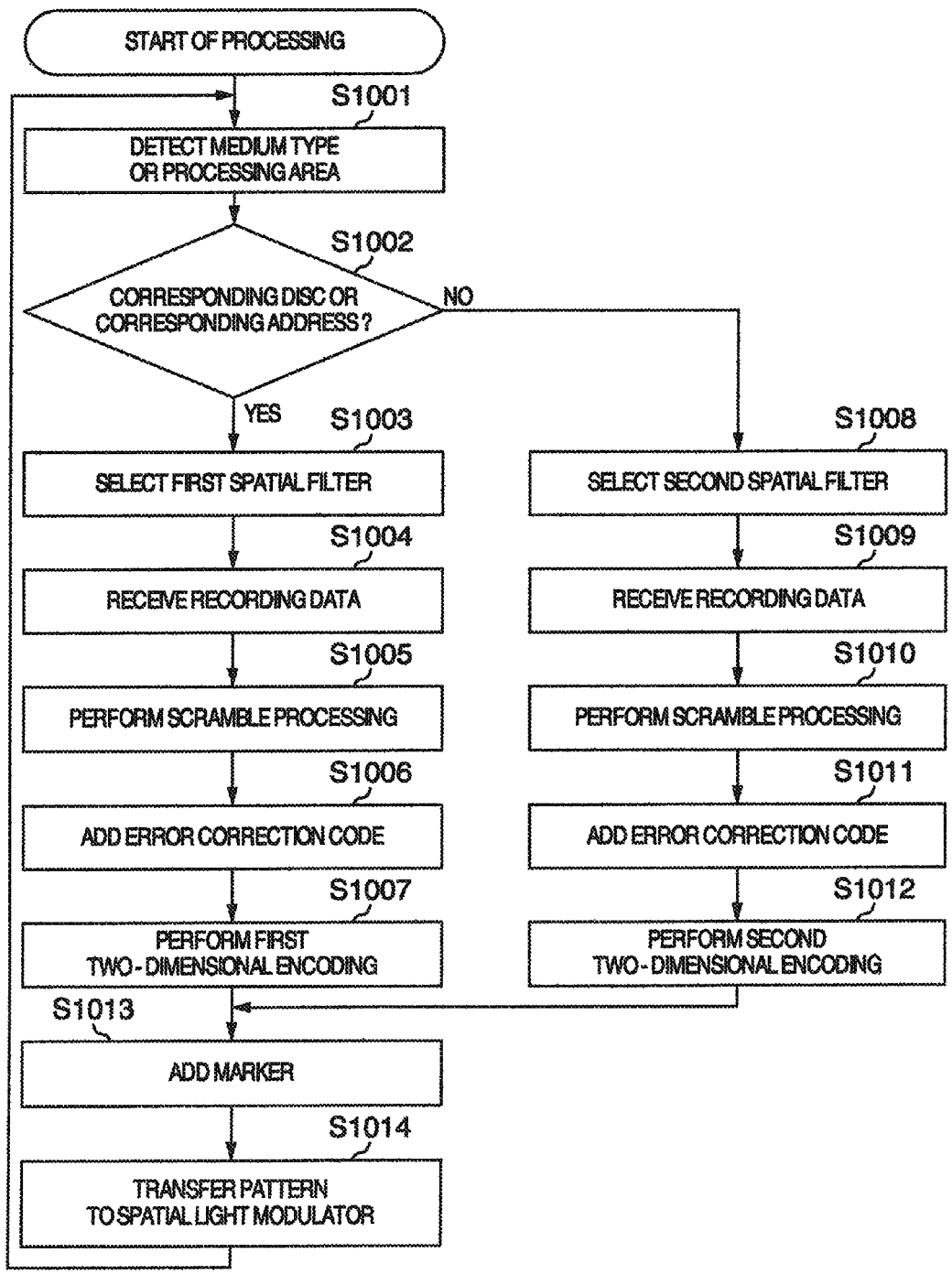
FIG. 10 is a flowchart showing an example of the detailed operation flow of the optical information recording/reproducing apparatus at data recording time.

FIG. 10 shows the detailed operation flow of S306 in FIG. 3B when the switching mode of the two-dimensional encoding method is used. The following describes the detailed operation. First, the type of recording medium that is used or the position at which the processing is currently being performed is detected (S1001), and a check is made to determine if the medium is the one that is set in advance or if the processing position is the one being processed (S1002). If so, the first encoding method is selected, and the aperture of the spatial filter 313 is made variable so that it is suited for use in the first encoding method (S1003). After that, when the signal generation circuit 86 receives the one page of recording data corresponding to the first encoding method (S1004), the scramble processing is performed for the data columns (S1005), and an error correction coding such as a Reed-Solomon coding is added (S1006). Next, the two-dimensional data is configured from this data for each N bits according to the first encoding method (S1007). A marker, which will be used as the base at reproduction time, is added to the two-dimensional data configured in this way (S1013) and data is transferred to the spatial light modulator 308 (S1014).

In contrast, if it is determined in S1002 that the medium is different from one that is set in advance or the processing position is different from the one being processed, the second encoding method is selected and, after that, the processing from S1008 to S1014 is performed. Those steps are the same as steps S1003 to S1014 for the first encoding method except that "first" is replaced by "second".

At reproduction time, a check is made in the same way as above to determine if the medium is the one that is set in advance or if the processing position is the one being processed and, based on the result, one of two encoding methods, first and second, is selected for decoding.

Note that the detailed operation at recording time described above may be performed not in S306 in FIG. 3B but in S311 depending upon the drive operation as long as data can be recorded.

The shape of the spatial filter 313, though switched according to the encoding method in the example, need not necessarily be switched but the same spatial filter may be used depending upon the encoding method.

In addition, when the conventional method and the method in the embodiments are mixed as in the third embodiment, a flag, such as two-bit data, may be added to a book, a page, or a disc management area, or to a layer/area provided for the servo operation, to indicate that the conventional method is used when the flag is (0,0), the method in the first embodiment is used when the flag is (0,1), and the method in the second embodiment is used when the flag is (1,1). Providing such a flag increases the speed and reliability of the reproduction processing.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical information recording apparatus for recording information using holography, the apparatus comprising:
   a laser light source that generates a signal beam;
   a spatial light modulator that modulates the signal beam generated by the laser light source;
   a signal beam optical system that directs the signal beam modulated by the spatial light modulator to an optical information recording medium;
   a reference beam optical system that generates and directs a reference beam to the optical information recording medium;
   a signal generation unit that generates data by an encoding method in which a lower-limit of a number of continuous ON/OFF pixels in an array in one direction of pixels in the spatial light modulator is K (k≥2, K: natural number); and
   a filter that limits a size of the signal beam entering the optical information recording medium to a size according to the lower-limit of the number of continuous pixels for the data generated by the signal generation unit.

2. The optical information recording apparatus according to claim 1, wherein the reference beam is generated from the laser light source that generates the signal beam, and further comprising an angle controller that controls an incident angle of the reference beam generated from the laser light source into the optical information recording medium.

3. An optical information recording method for recording information using holography, the method comprising:
   generating a signal beam in a beam generating step;
   modulating the signal beam generated in the beam generating step in a spatial light modulating step;
   directing the signal beam modulated in the spatial light modulating step to an optical information recording medium in a signal beam irradiating step;

generating and leading a reference beam to the optical information recording medium in a reference beam irradiating step;

generating data by an encoding method in which a lower-limit of a number of continuous ON/OFF pixels in an array in one direction of pixels in the spatial light modulating step is K (K≥2, K: natural number) in a signal generating step; and limiting a size of the signal beam entering the optical information recording medium to a size according to the lower-limit of the number of continuous pixels generated in the signal generating step in a limiting step.

4. The optical information recording method according to claim 3, wherein the reference beam is generated in the beam generating step, and further comprising controlling an incident angle of the reference beam generated in the beam generating step into the optical information recording medium in an angle controlling step.

5. An optical information reproducing apparatus for reproducing information from an optical recording medium in which an interference stripe pattern is recorded as a hologram when a signal beam modulated by a spatial modulator and a reference beam are overlapped, the signal beam being modulated by the spatial modulator based on data generated by an encoding method in which a lower-limit of a number of continuous ON/OFF pixels in an array in one direction of pixels in the spatial light modulator is K (K≥2, K: natural number), the apparatus comprising:

a laser light source that generates a reference beam;

an objective lens that converges a reproduced beam that is reproduced by irradiating the reference beam that is entered in the optical recording medium to the hologram;

a filter that limits a size of the reproduced beam converged by the objective lens to a size according to the lower-limit of the number of continuous pixels in the encoding method.

6. The optical information reproducing apparatus according to claim 5, further comprising an angle controller that controls an incident angle of the reference beam generated by the laser light source into the optical information recording medium.

7. The optical information reproducing apparatus according to claim 5, wherein a lower-limit of a number of continuous ON/OFF pixels in an array in the orthogonal direction to the direction in which the lower-limit K of the number of continuous pixels is determined is L (L≥2, L: natural number).

8. The optical information reproducing apparatus according to claim 6, wherein a lower-limit of a number of continuous ON/OFF pixels in an array in the orthogonal direction to the direction in which the lower-limit K of the number of continuous pixels is determined is L (L≥2, L: natural number).

9. An optical information reproducing method for reproducing information from an optical recording medium in which an interference stripe pattern is recorded as a hologram that is generated when a signal beam modulated by a spatial modulator and a reference beam are overlapped, the signal beam being modulated by the spatial modulator based on data generated by an encoding method in which a lower-limit of a number of continuous ON/OFF pixels in an array in one direction of pixels in the spatial light modulator is K (K≥2, K: natural number), the method comprising:

generating a reference beam in a beam generating step;

converging a reproduced beam that is reproduced by irradiating the reference beam entered in the optical recording medium to the hologram in a converging step;

limiting a size of the reproduced beam converged by the objective lens to a size according to the lower-limit of the number of continuous pixels in the encoding method in a limiting step.

10. The optical information reproducing method according to claim 9, further comprising controlling an incident angle of the reference beam generated in the beam generating step into the optical information recording medium in an angle controlling step.

11. The optical information reproducing method according to claim 9, wherein a lower-limit of a number of continuous ON/OFF pixels in an array in the orthogonal direction to the direction in which the lower-limit K of the number of continuous pixels is determined is L (L≥2, L: natural number).

12. The optical information reproducing method according to claim 10, wherein a lower-limit of a number of continuous ON/OFF pixels in an array in the orthogonal direction to the direction in which the lower-limit K of the number of continuous pixels is determined is L (L≥2, L: natural number).

13. An optical information recording apparatus for recording information using holography, the apparatus comprising:

a laser light source that generates a signal beam;

a spatial light modulator that modulates the signal beam generated by the laser light source;

a signal beam optical system that directs the signal beam modulated by the spatial light modulator to an optical information recording medium;

a reference beam optical system that generates and directs a reference beam to the optical information recording medium;

a signal generation unit that generates data by an encoding method in which a lower-limit of a number of continuous ON/OFF pixels in an array in one direction of pixels in the spatial light modulator K (K≥2, K: natural number); and a filter that limits a size of the signal beam entering the optical information recording medium to a size according to the lower-limit of the number of continuous pixels generated by the signal generation unit, and wherein the lower-limit of the number of continuous pixels in the signal generation unit is switched according to a recording region and/or a type of medium, and a characteristic of the filter is switched according to the switched lower-limit of the number of continuous pixels.

14. The optical information recording apparatus according to claim 13, wherein the reference beam is generated from the laser light source that generates the signal beam, and further comprising an angle controller that controls an incident angle of the reference beam generated by the laser light source into the optical information recording medium.

15. The optical information recording apparatus according to claim 13, wherein a lower-limit of a number of continuous ON/OFF pixels in an array in the orthogonal direction to the direction in which the lower-limit K of the number of continuous pixels is determined is L (L≥2, L: natural number).

16. The optical information recording apparatus according to claim 14, wherein a lower-limit of a number of continuous ON/OFF pixels in an array in the orthogonal direction to the direction in which the lower-limit K of the number of continuous pixels is determined is L (L≥2, L: natural number).

17. An optical information recording method for recording information using holography, the method comprising:

generating a signal beam in a beam generating step;

modulating the signal beam generated in the beam generating step in a spatial light modulating step directing the signal beam modulated in the spatial light modulating step to an optical information recording medium in a signal beam irradiating step;

generating and directing a reference beam to the optical information recording medium in a reference beam irradiating step; and generating data by an encoding method in which a lower-limit of a number of continuous ON/OFF pixels in an array in one direction of pixels in the spatial light modulating step is K (K≥2, K: natural number) in a signal generating step, wherein the lower-limit of the number of continuous pixels in the signal generating step is switched according to a recording region and/or a type of medium.

18. The optical information recording method according to claim 17, wherein the reference beam is generated in the beam generating step, and further comprising controlling an incident angle of the reference beam generated in the beam generating step into the optical information recording medium in an angle controlling step.

19. The optical information recording method according to claim 17, wherein a lower-limit of a number of continuous ON/OFF pixels in an array in the orthogonal direction to the direction in which the lower-limit K of the number of continuous pixels is determined is L (L≥2, L: natural number).

20. The optical information recording method according to claim 18, wherein a lower-limit of a number of continuous ON/OFF pixels in an array in the orthogonal direction to the direction in which the lower-limit K of the number of continuous pixels is determined is L (L≥2, L: natural number).

21. The optical information recording method according to claim 17, further comprising limiting a size of the signal beam entering the optical information recording medium to a size according to the lower-limit of the number of continuous pixels generated in the signal step in a limiting step, wherein the lower-limit of the number of continuous pixels in the signal generating step is switched according to a recording region and/or a type of medium, and wherein the size of the signal beam limited in the limiting step is switched according to the switched lower-limit of the number of continuous pixels.

22. The optical information recording method according to claim 18, further comprising limiting a size of the signal beam entering the optical information recording medium to a size according to the lower-limit of the number of continuous pixels generated in the signal generating step in a limiting step, wherein the lower-limit of the number of continuous pixels in the signal generating step is switched according to a recording region and/or a type of medium, and wherein the size of the signal beam limited in the limiting step is switched according to the switched lower-limit of the number of continuous pixels.

23. The optical information recording method according to claim 21, wherein a lower-limit of a number of continuous ON/OFF pixels in an array in the orthogonal direction to the direction in which the lower-limit K of the number of continuous pixels is determined is L (L≥2, L: natural number).

24. The optical information recording method according to claim 22, wherein a lower-limit of a number of continuous ON/OFF pixels in an array in the orthogonal direction to the direction in which the lower-limit K of the number of continuous pixels is determined is L (L≥2, L: natural number).

25. An optical information reproducing apparatus for reproducing information from an optical recording medium in which an interference stripe pattern is recorded as a hologram that is generated when a signal beam modulated by a spatial modulator and a reference beam are overlapped, the signal beam being modulated by the spatial modulator based on data generated by an encoding method in which a lower-limit of a number of continuous ON/OFF pixels in an array in one direction of pixels in the spatial light modulator is K (K≥2, K: natural number), the apparatus comprising:

a laser light source that generates a reference beam;

an objective lens that converges a reproduced beam that is reproduced by irradiating the reference beam entered in the optical, recording medium to the hologram; and a filter that limits a size of the reproduced beam converged by the objective lens to a size according to the lower-limit of the number of continuous pixels in the encoding method, and wherein the lower-limit of the number of continuous pixels in the encoding method is switched according to a reproducing region and/or a type of medium, and a characteristic of the filter is switched according to the switched lower-limit of the number of continuous pixels.

26. The optical information reproducing apparatus according to claim 25, further comprising an angle controller that controls an incident angle of the reference beam generated by the laser light source into the optical information recording medium.

27. The optical information reproducing apparatus according to claim 25, wherein a lower-limit of a number of continuous ON/OFF pixels in an array in the orthogonal direction to the direction in which the lower-limit K of the number of continuous pixels is determined is L (L≥2, L: natural number).

28. The optical information reproducing apparatus according to claim 26, wherein a lower-limit of a number of continuous ON/OFF pixels in an array in the orthogonal direction to the direction in which the lower-limit K of the number of continuous pixels is determined is L (L≥2, L: natural number).

29. An optical information reproducing method for reproducing information from an optical recording medium in which an interference stripe pattern is recorded as a hologram that is generated when a signal beam modulated by a spatial modulator and a reference beam are overlapped, the signal beam being modulated by the spatial modulator based on data generated by an encoding method in which a lower-limit of a number of continuous ON/OFF pixels in an array in one direction of pixels in the spatial light modulator is K (K≥2, K: natural number), the method comprising:

generating a reference beam in a beam generating step; and converging a reproduced beam that is reproduced by irradiating the reference beam entered in the optical recording medium to the hologram in a converging step, and wherein the lower-limit of the number of continuous pixels in the encoding method is switched according to a reproducing region and/or a type of medium.

30. The optical information reproducing method according to claim 29, further comprising controlling an incident angle of the reference beam generated in the beam generating step into the optical information recording medium in an angle controlling step.

31. The optical information reproducing method according to claim 29, wherein a lower-limit of a number of continuous ON/OFF pixels in an array in the orthogonal direction to the direction in which the lower-limit K of the number of continuous pixels is determined is L (L≥2, L: natural number).

32. The optical information reproducing method according to claim 30, wherein a lower-limit of a number of continuous ON/OFF pixels in an array in the orthogonal direction to the direction in which the lower-limit K of the number of continuous pixels is determined is L (L≥2, L: natural number).

33. The optical information reproducing method according to claim 29, further comprising limiting a size of the reproduced beam converged in the converging step to a size according to the lower-limit of the number of continuous pixels in the encoding method in a limiting step, wherein the lower-limit of the number of continuous pixels in the encoding method is switched according to a reproducing region and/or a type of medium, and wherein the size of the signal beam limited in the limiting step is switched according to the switched lower-limit of the number of continuous pixels.

34. The optical information reproducing method according to claim 30, further comprising limiting a size of the reproduced beam converged in the converging step to a size according to the lower-limit of the number of continuous pixels in the encoding method in a limiting step, wherein the lower-limit of the number of continuous pixels in the encoding method is switched according to a reproducing region and/or a type of medium, and wherein the size of the signal beam limited in the limiting step is switched according to the switched lower-limit of the number of continuous pixels.

35. The optical information reproducing method according to claim 33, wherein a lower-limit of a number of continuous ON/OFF pixels in an array in the orthogonal direction to the direction in which the lower-limit K of the number of continuous pixels is determined is L (L≥2, L: natural number).

36. The optical information reproducing method according to claim 34, wherein a lower-limit of a number of continuous ON/OFF pixels in an array in the orthogonal direction to the direction in which the lower-limit K of the number of continuous pixels is determined is L (L≥2, L: natural number).

* * * * *

UNITED STATES PATENT AND TRADEMARK OFFICE
CERTIFICATE OF CORRECTION

| | |
|---|---|
| PATENT NO. | : 8,760,988 B2 |
| APPLICATION NO. | : 13/752736 |
| DATED | : June 24, 2014 |
| INVENTOR(S) | : Yusuke Nakamura |

It is certified that error appears in the above-identified patent and that said Letters Patent is hereby corrected as shown below:

Title page, item (73) Assignee please change:

"Hitachi, Ltd., Tokyo (JP)" to -- Hitachi Consumer Electronics Co., Ltd., Tokyo (JP) --

Signed and Sealed this
Thirteenth Day of October, 2015

Michelle K. Lee
*Director of the United States Patent and Trademark Office*